April 23, 1940.  L. P. CURTIN  2,198,527
PURIFICATION OF SAND
Filed Sept. 10, 1938
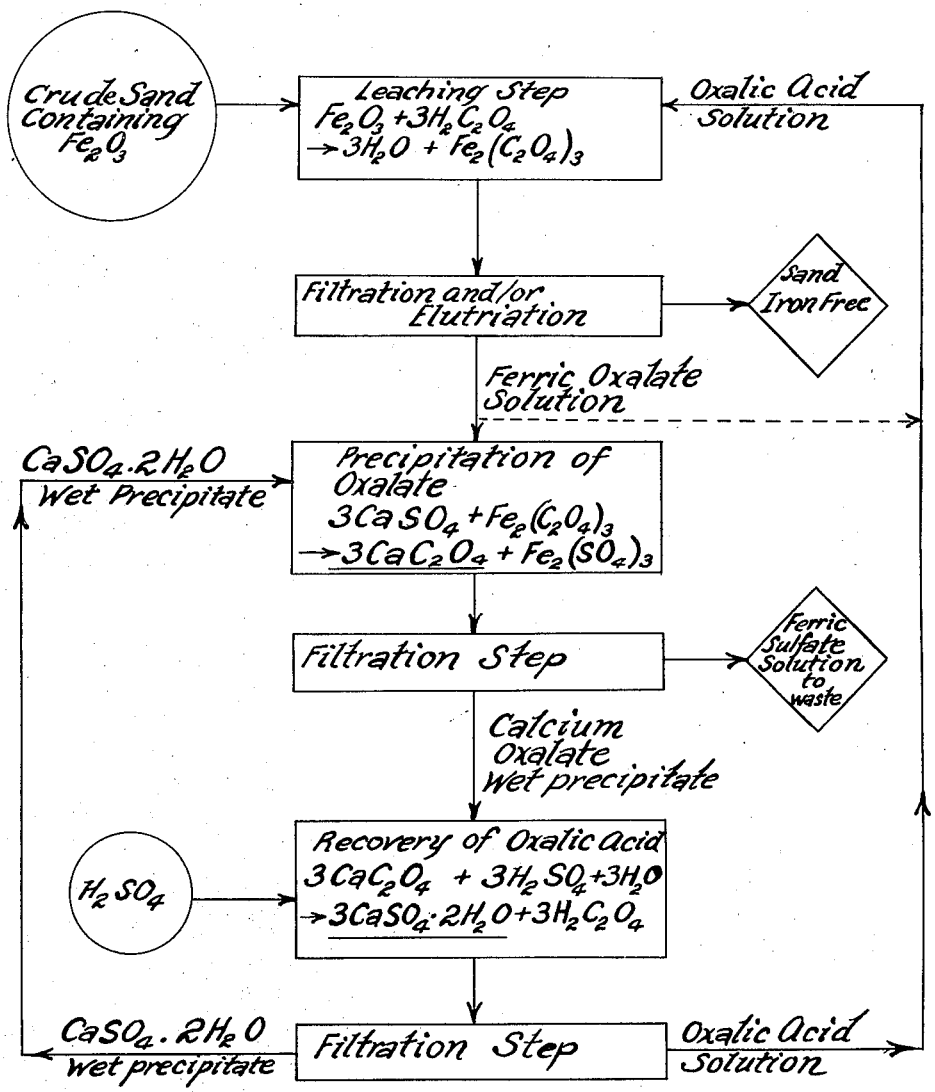
INVENTOR,
Leo P. Curtin
BY
Henry C. Parker
ATTORNEYS Patented Apr. 23, 1940

2,198,527

UNITED STATES PATENT OFFICE 2,198,527

PURIFICATION OF SAND

Leo P. Curtin, Cranbury, N. J., assignor of one-third to Henry C. Parker, Washington, D. C.

Application September 10, 1938, Serial No. 229,381

16 Claims. (Cl. 252—8)

This invention relates to purification of sand; and it comprises a process wherein a crude sand, containing impurities of iron oxide is subjected to a leaching step in the presence of a dilute oxalic acid solution; this leaching step being usually conducted with a counter current flow of said sand and a hot oxalic acid leach liquor, the substantially iron free sand being then recovered from the spent leach liquor; the oxalate values in said spent leach liquor are recovered by digesting it with calcium sulfate to convert its iron oxalate content into a precipitate of calcium oxalate and a solution of iron sulfate, the latter usually being discarded while the precipitate of calcium oxalate is treated with sulfuric acid to recover calcium sulfate and oxalic acid, the recovered oxalic acid being then returned to the initial step of the process, the calcium sulfate being also advantageously returned to the process step wherein the spent leach liquor is digested with calcium sulfate; all as more fully hereinafter set forth and claimed.

While sand of rather high purity occurs in natural deposits in various parts of the country, the expense of transportation prevents many industries which employ sand in large quantities from using such deposits. The bulk of the sand employed industrially contains substantial quantities of impurities among which iron oxide ranks high, both in quantity and in the detrimental results produced. For many purposes this iron oxide content must be substantially reduced in order that high grade products can be produced. This is particularly true in the manufacture of high quality colorless glass, in the manufacture of fused quartz-ware and in the manufacture of alkali metal silicates, for example. In other industries, such as in the manufacture of optical glass, the presence of iron is still more highly detrimental. Commercial specifications for sand invariably set out minimum tolerances for the iron content which range, in different industries, from about 0.03 to 1 per cent by weight.

Iron occurs in sand in several different forms. The bulk of the iron, however, usually occurs as ferric oxide, $Fe_2O_3$. Some ferrous oxide may be present and it is not uncommon to find traces of metallic iron. The ferric oxide may occur as discrete particles or as a stain on the sand grains. Washing with water in most instances has little if any effect upon this iron content.

A large number of methods, both chemical and mechanical, have been developed and used for the elimination or reduction of the iron content of sand. It is obvious, of course, that any method, to be commercially feasible, must be very inexpensive, owing to the competing prices of natural deposits of sand of substantial purity.

The chemical method most frequently used industrially for the purification of sand consists in leaching with acid and, on account of its cheapness, sulfuric acid has been the acid most commonly used. It has been found, however, that sulfuric acid is not entirely satisfactory for removing ferric oxide unless a reducing agent is present. Among the various reducing agents suggested it has been proposed to add oxalic acid to the sulfuric acid leach liquor. This results in the formation of carbon monoxide and, of course, in the destruction of the oxalic acid. It has also been proposed to use solutions of alkali metal acid-oxalates as leaching agents, as well as solutions containing ferrous sulfate mixed with oxalates. But in all cases wherein it has been proposed to employ various oxalate-containing solutions, no feasible method of recovering the oxalate values from the spent leach liquor has been suggested. And it is quite obvious that any process, in which oxalic acid or an oxalate is consumed in any quantity, is not commercially feasible for use in purifying sand.

I have found a method, however, in which oxalic acid is employed as a leach liquor to remove iron from sand and wherein the oxalic acid is readily recovered for reuse in the process. The only chemical consumed in the process, aside from inevitable losses, is sulfuric acid. And the sulfuric acid is consumed in only small quantities; in fact the quantity of this chemical used is only slightly greater than that theoretically required to convert the iron contained in the sand into ferric sulfate, that is, in order to remove 1 pound of $Fe_2O_3$ my process theoretically requires the consumption of only about 1.84 pounds of sulfuric acid. It is thus seen that my process is very economical in the chemicals consumed.

The oxalic acid, which is used in the leaching step of my process dissolves the iron impurities which are found in the usual sand many times more effectively than sulfuric or hydrochloric acids. And since the oxalic acid is recovered, the cost of the chemicals used in my process is only a small fraction of the cost of employing these acids for leaching purposes. When sulfuric acid is employed as a leaching agent for the removal of iron from sand, its consumption is, of course, many times greater than that which occurs in my process.

For most purposes and for sands of ordinary initial purity, it is only necessary to conduct the leaching step of my process for a short period, using a relatively dilute solution of oxalic acid which is advantageously heated. This step is followed by filtration and/or an elutriation step in which the dissolved iron oxalate is removed from the purified sand. The oxalic acid readily dissolves all ferric iron and converts any ferrous iron to ferrous oxalate which is soluble in solutions containing ferric oxalate. As soon as my oxalic acid leach liquor has dissolved appreciable quantities of ferric iron, therefore, it also dissolves any ferrous oxalate which may be formed as a result of the action of the liquor on either ferrous iron or metallic iron. It is thus seen that both ferric and ferrous iron are removed in the leaching step of my process. It is also true, of course, that any fine particles of metallic iron are converted into ferrous oxalate and are then dissolved in the leach liquor, being thus removed from the sand in my process.

The impurities which are dissolved in the leach liquor can, of course, be eliminated by a simple filtration or decantation step. It is usually advantageous, however, to separate the sand from the leach liquor by means of an elutriation step which involves decantation of the spent liquor while the sand is being agitated and preferably while wash water is flowing upwardly through the sand. This step serves to remove the bulk of the impurities of lighter weight than sand. Such impurities are invariably present in crude sand.

The oxalate values of the spent leach liquor are recovered in my process by steps which include the digestion of this liquor with calcium sulfate, the latter usually being freshly precipitated $CaSO_4 \cdot 2H_2O$ which can be used in excess and which may be obtained from a later step of the process. This step produces the precipitation of the oxalate values in the form of the highly insoluble calcium oxalate, the recovery being substantially complete even with dilute leach liquors. The precipitated calcium oxalate is filtered off and is then treated with sulfuric acid which converts the calcium oxalate into calcium sulfate and liberates the oxalic acid, the latter being returned to the process. The precipitate of calcium sulfate may also be returned to the process to be employed in the step wherein the oxalate values are precipitated as calcium oxalate by digestion with calcium sulfate.

The principal chemical equations which are involved in the above process are as follows:

1. $Fe_2O_3 + 3H_2C_2O_4 \rightarrow 3H_2O + Fe_2(C_2O_4)_3$
2. $Fe_2(C_2O_4) + 3CaSO_4 \cdot 2H_2O \rightarrow$
   $3CaC_2O_4 \cdot H_2O + Fe_2(SO_4)_3 + 3H_2O$
3. $3CaC_2O_4 \cdot H_2O + 3H_2SO_4 + 3H_2O \rightarrow$
   $3CaSO_4 \cdot 2H_2O + 3H_2C_2O_4$ Adding: $Fe_2O_3 + 3H_2SO_4 \rightarrow 3H_2O + Fe_2(SO_4)_3$ The complete process of the present invention can be understood readily by referring to the accompanying drawing which is a flow sheet showing each process step in its relation to the steps which precede and follow it. In this showing the circles designate raw materials used in the process, that is the crude iron-containing sand and the sulfuric acid, which are the only materials other than water which enter the process. The rectangles designate the various process steps which are indicated by appropriate legends. The chemical reactions which occur are also indicated within the rectangles. The diamond-shaped figures represent the materials which leave the process, namely the purified sand and a ferric sulfate solution which is usually run to waste. If desired, of course, the ferric sulfate can be recovered from this solution but usually its concentration is too low to make its recovery feasible.

The concentration of oxalic acid which is employed in the leaching step of my process can be varied rather widely without having much effect upon the rate of extraction of iron and the efficiency of the process. In general it is desirable to employ dilute solutions in preference to concentrated solutions for the reason that losses are somewhat less. It is therefore usually advisable to employ solutions having a concentration barely sufficient to produce the required rate or extent of extraction. I have found my method to be operative over concentrations varying from about 1 to 10 per cent but best results are usually obtained over the narrower range of from 3 to 6 per cent by weight.

Leaching is advantageously conducted with a counter current flow of sand and of leach liquor. For this purpose there can be employed any of the well known types of equipment which are designed for the leaching of solids by liquids in counter flow. The so-called washing classifiers, for example, have been found suitable. By the counter flow method the quantity of leach liquor employed can be kept at a minimum. It is possible to employ a considerable volume of wash water in washing the sand free from the spent leach liquor without substantially affecting the subsequent recovery of the oxalate values from this liquor, owing to the extreme insolubility of calcium oxalate and the consequent high efficiency obtained in the precipitation step of my process. It is advantageous to employ an elevated temperature in the leaching step for the reason that the extraction of iron is accomplished more rapidly and more completely at these temperatures. Temperatures ranging from about 50° to 90° C. are useful, for example. Satisfactory extraction can usually be obtained within a period ranging from about 20 to 60 minutes, this time depending upon the temperature used in this step, the type of impurities present in the sand and the physical characteristics of the sand.

In the precipitation step of my process wherein the oxalate values are precipitated in the form of calcium oxalate, it is possible to employ a considerable excess of the calcium sulfate. Any excess of this material merely circulates through the path indicated on the flow sheet. It remains inert during the acid treating step. When calcium sulfate is used in excess a somewhat higher recovery of the oxalate values is obtained. The use of elevated temperatures is desirable in this precipitation step. But if the leach liquor is heated in the leaching step, sufficient heat is usually retained by the spent liquor to produce favorable reaction temperatures when this liquor is treated later with calcium sulfate. As indicated above, the recovery of oxalate values from the spent leach liquor is substantially complete. This leach liquor normally contains a small concentration of oxalic acid and also a small amount of insoluble, extraneous oxalates which may be in suspension. But upon digestion with the calcium sulfate substantially the entire oxalate content of the spent leach liquor is converted into the highly insoluble calcium oxalate and is therefore recovered in the following steps of my process.

The concentration of sulfuric acid used in the acid treating step of my process can be widely varied. It is possible to employ relatively dilute acid solutions since such solutions are capable of liberating oxalic acid from calcium oxalate in concentrations sufficiently high to produce effective leach liquors. It is therefore usually possible to employ the cheapest source of sulfuric acid available in this acid treating step. If the oxalic acid obtained from this step is more concentrated than that desired in the leaching step it is merely necessary to dilute it with water. This acid treating step can also be conducted advantageously in counter current in one of the conventional types of equipment.

It is evident from the equation of the reaction which takes place in the acid treating step of my process that theoretically the quantity of sulfuric acid consumed in this step corresponds to that required to form oxalic acid from the calcium oxalate. In practice it is, of course, necessary to employ sulfuric acid in excess of this quantity although the excess required is not great. The calcium oxalate can be recovered from the preceding step as a filter cake containing only a small amount of water, hence the acid used in the acid treating step is only slightly diluted. This partially accounts for the economy of chemicals employed in my process.

It will be readily recognized by the art that the various steps of my process cooperate to make the process as a whole extremely economical and effective in accomplishing the desired results. For example, if materials, which are capable of forming insoluble oxalates, are present in the crude sand, these are converted into the corresponding oxalates in the leaching step. Aluminum and calcium compounds, for example, are largely converted into the corresponding insoluble oxalates. But if elutriation or a centrifugal method is employed to separate the purified sand from the spent leach liquor, the bulk of these insoluble oxalates is carried over into the spent liquor and the oxalate values can then be recovered in the later steps of the process. My process is thus capable of removing substantially all impurities from the sand which are acted upon by the oxalic acid to produce either soluble or insoluble oxalates.

As stated previously, the precipitation step of my process is highly efficient on account of the extremely low solubility of calcium oxalate and the recovery of oxalate values in this step is substantially complete. The iron and any other sulfates which are formed in this step are readily soluble and the calcium oxalate is obtained in a readily filtrable form which can be removed from the solution either by ordinary filtration methods or by decantation. Continuous decantation can be used, for example, with or without a subsequent filtration.

In the acid treating step of my process all insoluble oxalates, which are formed in the precipitation step or which may have been produced in the initial leaching step and carried over in suspension into the spent leach liquor, are converted into oxalic acid. The recovery of oxalic acid is thus substantially complete. Since considerable quantities of wash water can be used in the filtration step which follows the leaching step, it is evident that very little oxalic acid is lost by entrapment or occlusion in the purified sand. The sulfuric acid which is used in my process is the cheapest acid available and this acid need be employed, at least theoretically, in quantities which are only sufficient to dissolve the iron to produce ferric sulfate. Even this acid is conserved. It is therefore evident that my method supplies a highly efficient and at the same time a very low cost method of purifying sand by removal of the iron content as well as the bulk of the other commonly occurring impurities. No special equipment is required, no special hazards are involved and each of the process steps employed are included within the conventional so-called "unit processes" of chemical engineering, which require a minimum of development and engineering work.

While I have described what I consider to be the best embodiments of my invention it is evident that my process can be modified in various ways within the skill of the art to adapt it to the treatment of crude sands containing special types of impurities or sands which may be used for special purposes. Thus it is sometimes desirable to add to or to modify the various process steps which are shown in the flow sheet. For example, if the crude sand contains substantial quantities of metallic iron, it may be desirable to conduct an initial step in which the sand is ignited in an oxidizing atmosphere in order to burn out any organic materials and at the same time to oxidize all iron to the ferric state. It is also possible to employ oxidizing agents in the leaching step wherein the crude sand is treated with an oxalic acid leach liquor. If the crude sand contains substantial amounts of organic materials, as well as other impurities producing the formation of insoluble oxalates, an elutriation step or a centrifuging step will remove the organic materials as well as the insoluble oxalates from the sand, these materials being carried over into the spent leach liquor. This liquor will therefore contain considerable matter in suspension. If desired this insoluble matter can be filtered off from the spent liquor and treated on the filter, for example, with sulfuric acid for recovery of oxalic acid from the insoluble oxalates, this oxalic acid then being returned to the process. This procedure removes the organic and other extraneous insoluble matter from the spent leach liquor while providing for the recovery of the small amount of oxalic acid which otherwise might be lost due to the formation of insoluble oxalates in the leaching step of my process.

In the precipitation step of my process wherein the spent leach liquor is treated with calcium sulfate it is possible, of course, to employ finely divided native gypsum instead of the precipitated calcium sulfate which is recovered in the acid treating step. But the precipitated calcium sulfate is more soluble and, in general, more advantageous to employ. This step can be conducted in counter current in conventional equipment.

In addition to the modifications suggested above it is possible to combine the process steps of my invention with any of the other conventional processes which are designed to remove special types of impurities. For example, any metallic iron can be removed from the crude sand by electromagnetic methods prior to conducting the present process. Impurities of alumina, organic impurities, etc. can likewise be removed by methods known in the art. The relative quantities of chemicals which are required in the various steps of my process are substantially as indicated by the equations which have been given for the chemical reactions involved. Each of these chemical reactions goes substantially to completion. But it is possible, of course, to increase the speed and completeness of these reactions by employing, for example, an excess of oxalic acid in the leaching step and an excess of sulfuric acid in the acid treating step. The over-all cost of the process is but little affected by this use of excess chemicals. In a further modification of my process it is possible to recycle a portion of the spent leach liquor after the filtration or elutriation step, as indicated on the flow sheet in dotted lines. This ensures the presence of sufficient ferric oxalate in the leach liquor to dissolve any ferrous iron. My process can be conducted either as a batch method or as a continuous process. Other modifications which fall within the scope of the following claims and hence within the purview of my invention will be immediately evident to those skilled in this art.

What I claim is:

1. The process of purifying crude sands containing impurities of $Fe_2O_3$ which comprises the chemical reactions designated by the following equations:

1. $Fe_2O_3 + 3H_2C_2O_4 \rightarrow 3H_2O + Fe_2(C_2O_4)_3$
    2. $Fe_2(C_2O_4)_3 + 3CaSO_4.2H_2O \rightarrow$
       $3CaC_2O_4.H_2O + Fe_2(SO_4)_3 + 3H_2O$
    3. $3CaC_2O_4.H_2O + 3H_2SO_4 + 3H_2O \rightarrow$
       $3CaSO_4.2H_2O + 3H_2C_2O_4$ 2. In the purification of crude sands containing iron as an impurity, the process which comprises leaching such a crude sand with a leach liquor containing oxalic acid, removing the spent liquor from the purified sand, digesting said spent liquor with calcium sulfate to precipitate the oxalate values as calcium oxalate, separating the solids from the liquor, treating said solids with sulfuric acid to convert the oxalate content into oxalic acid and returning the oxalic acid to the first step of the process.

3. The process of claim 2 wherein the calcium sulfate formed in the acid treating step is returned to the step wherein said spent liquor is digested with calcium sulfate.

4. The process of claim 2 wherein the spent liquor is removed from the purified sand by a method which causes the lighter solids in the sand, including any insoluble oxalates formed during leaching, to be carried over into the spent leach liquor.

5. The process of claim 2 wherein said leach liquor contains oxalic acid having a concentration ranging from about 1 to 10 per cent by weight.

6. The process of claim 2 wherein said leach liquor is heated to temperatures ranging from about 50 to 90° C. and contains oxalic acid in concentrations ranging from about 1 to 10 per cent by weight.

7. The process of claim 2 wherein said calcium sulfate is freshly precipitated $CaSO_4.2H_2O$ employed substantially in excess of theoretical proportions.

8. The process of claim 2 wherein the crude sand is heated in an oxidizing atmosphere, to destroy organic matter and to oxidize any metallic iron before being leached with said leach liquor.

9. The process of claim 2 wherein the leaching of the crude sand is conducted continuously with a counter flow of hot leach liquor and said sand.

10. The process of claim 2 wherein the digestion of said spent liquor with calcium sulfate is conducted continuously with a counter flow of said leach liquor and said calcium sulfate.

11. The process of claim 2 wherein the acid treating step is conducted continuously with a counter flow of sulfuric acid and said solids containing calcium oxalate.

12. The process which comprises leaching a crude sand for removal of its iron content with a leach liquor containing oxalic acid, separating the purified sand from the spent leach liquor by a method causing the lighter solids in said sand to be carried over into the spent leach liquor, then removing the solids from said spent leach liquor and digesting them with sulfuric acid to recover oxalic acid from the insoluble oxalates in said solids.

13. In the purification of crude sands containing iron as an impurity, the process which comprises leaching the iron from such a sand by treating it with a dilute solution of oxalic acid, separating the purified sand from the spent leach liquor, digesting the latter with precipitated calcium sulfate to convert its iron oxalate content into calcium oxalate, recovering the said calcium oxalate and treating it with sulfuric acid to form oxalic acid and calcium sulfate, returning said oxalic acid to the first step of the process and returning the said calcium sulfate to the digestion step of the process.

14. In the purification of crude sands containing iron as an impurity, the process which comprises continuously leaching such a sand with an oxalic acid solution passed in counter current to said sand, removing the spent leach liquor from the purified sand, passing said spent leach liquor continuously in counter current to precipitated calcium sulfate, recovering the resulting precipitate of calcium oxalate, treating said calcium oxalate continuously with sulfuric acid passing in counter current, returning the resulting solution of oxalic acid to the first step of the process and returning the resulting precipitated calcium sulfate to be used in the second counter current step of the process.

15. The process which comprises leaching the ferric and ferrous iron from a crude sand with a solution of oxalic acid, treating the resulting solution of iron oxalates with calcium sulfate, treating the resulting precipitate of calcium oxalate with sulfuric acid and returning the resulting solution of oxalic acid to the first step of the process.

16. In the purification of crude sands containing ferric iron as an impurity, the process which comprises leaching the ferric iron from such a sand with a hot solution of oxalic acid capable of reacting therewith in accordance with the equation, $Fe_2O_3 + 3H_2C_2O_4 \rightarrow 3H_2O + Fe_2(C_2O_4)_3$ reacting the resulting spent liquor containing ferric oxalate with precipitated calcium sulfate in accordance with the equation, $Fe_2(C_2O_4)_3 + 3CaSO_4.2H_2O \rightarrow$
$3CaC_2O_4.H_2O + Fe_2(SO_4)_3 + 3H_2O$ treating the resulting calcium oxalate with sufficient sulfuric acid to produce a reaction corresponding to the equation, $3CaC_2O_4.H_2O + 3H_2SO_4 + 3H_2O \rightarrow$
$3CaSO_4.2H_2O + 3H_2C_2O_4$ returning the resulting oxalic acid to the first step of the process and returning the resulting calcium sulfate to the second step of the process.

LEO P. CURTIN.